(12) United States Patent
Barone

(10) Patent No.: US 6,230,152 B1
(45) Date of Patent: May 8, 2001

(54) FUZZY CONTROLLER FOR LOOP MANAGEMENT OPERATING SYSTEM

(75) Inventor: Joseph Michael Barone, Basking Ridge, NJ (US)

(73) Assignee: Lucent Technologies Inc, Murray Hill, NJ (US)

( * ) Notice: Subject to any disclaimer, the term of this patent is extended or adjusted under 35 U.S.C. 154(b) by 0 days.

(21) Appl. No.: 08/951,548

(22) Filed: Oct. 16, 1997

(51) Int. Cl.$^7$ .................................................. G06N 17/00
(52) U.S. Cl. ........................... 706/45; 370/230; 370/232; 706/4; 706/6
(58) Field of Search .................... 370/230, 232; 706/45, 4, 6

(56) References Cited

U.S. PATENT DOCUMENTS

| | | | |
|---|---|---|---|
| 5,515,428 | * 5/1996 | Sestak et al. ........................ | 379/266 |
| 5,812,526 | * 9/1998 | Chang et al. ........................ | 370/230 |
| 5,841,084 | * 11/1998 | Thangavelu .......................... | 187/382 |

OTHER PUBLICATIONS

"Effective control of traffic flow in ATM networks using fuzzy, explicit rate marking (FERM)", Pitsillides, A.; Sekercioglu, Y.A.; Ramamurthy, G., Selected Areas in Communications, IEEE Journal on, vol.: 15, Feb. 1997, pp. 209–225.*

"Fuzzy service rate control of queueing systems", Zhang, R.; Phillis, Y.A., Systems, Man and Cybernetics, 1996., IEEE International, Conference on, vol: 4, 1996, pp.: 3045–3050 vol. 4.*

Chung–Ju Chang and Ray–Guang Cheng, Traffic Control in an ATM Network Using Fuzzy Set Theory, 1994 IEEE, pp. 9c.1.1–9c.1.8.*

* cited by examiner

Primary Examiner—Tariq R. Hafiz
Assistant Examiner—Edward G. Brown

(57) ABSTRACT

Fuzzy logic controller for a queue manager that services a plurality of queues in an iterative fashion, each queue containing an indeterminate number of elements, the manager iteratively servicing each of the plurality of queues in accordance with a dequeuing quantity parameter, Q. The controller comprises a device for determining an amount of queues having remaining elements after each servicing iteration and outputting the amount; a device for comparing the difference between a system output representing an amount of queues having remaining elements in a current iteration with a previous output representing an amount of queues having remaining elements in a predecessor iteration, the output difference indicating a first dequeuing trend; and, a device for adjusting the dequeuing quantity parameter Q based on the dequeuing trend, the adjusting device capable of driving the system output toward a predetermined setpoint quantity after each servicing iteration. The process is repeated for the next succeeding iteration to adjust a time delay parameter, T, representing a time delay between servicing each element of a said queue, and in the next iteration after that, for adjusting a time delay parameter, S, representing a time delay between servicing each successive queue. The process of changing Q, T and S parameters based on dequeuing trends is continuously repeated at each successive iteration of the queue manager.

24 Claims, 5 Drawing Sheets

US 6,230,152 B1

FUZZY CONTROLLER FOR LOOP MANAGEMENT OPERATING SYSTEM

FIELD OF THE INVENTION

The present invention relates generally to queue management systems and particularly, to a controller implementing fuzzy logic for controlling dequeuing operations of customer screening queues in a loop management operating system used by regional telephone companies.

BACKGROUND OF THE INVENTION

Currently, in the telephone industry, front end systems are provided that contain information about telephone customers, and particularly, telephone numbers, telephone service histories, and other relevant comments regarding, e.g., the customer's dwelling and service record. As shown in FIG. 1, such front end systems $50a,b, \ldots 50n$ are commonly known as Loop Management Operating Systems (hereinafter "LMOS") and interface with a remote host mainframe computer 75 containing the primary service and operational databases. The front end systems $50a,b, \ldots 50n$ maintain a facility for receiving telephone calls from customers requesting particular telephone service, e.g., when a telephone line or cable breaks, or when service is interrupted, etc., and service personnel enter details regarding the customer's complaint and service requested. Once the phone company investigates the particular problem(s) and determines the causality of the problem, it will dispatch maintenance personnel to rectify the problem.

As further shown in FIG. 1, each LMOS front end system deploys a plurality of screening maintenance centers ("SMC"), indicated as $80a1,2,3, \ldots, 80b1,2, \ldots$ and $80n1,2,3, \ldots$ that respond to particular calls, e.g., associated with a particular area or maintenance center, etc., and typically may have up to several hundred SMCs. Furthermore, as shown in FIG. 1, embedded in the LMOS front end systems are rule-based expert systems $90a,b, \ldots 90n$ that can automatically determine the nature of a trouble before dispatching a service rig, or, e.g., determine if the source of the problem is to be correctly assigned to that front end center. One expert system in particular is the screener decision unit ("SDU") which takes a trouble description, e.g., as typically called-in by a customer, looks at the various properties of the trouble, e.g., telephone number, exchange, etc., and looks to see if there is any way to automatically handle the call. For example, the SDU may automatically determine if another front end should be handling the call, or, automatically send the call to a dispatch maintenance center. All trouble calls are placed in a queue to await disposition via the expert systems just described. The queue contains, for each trouble, a pointer to relevant information such as customer name, telephone number, trouble code, etc. There is one queue for each SMC on the front end.

As shown in FIG. 2, the front end will generate a queue 85, corresponding to a particular SMC associated with that front end, with each queue containing pointers 86, as described above, that point to the particular record of the customer calling in the trouble situation. Depending upon circumstances, e.g., system load, etc., the queue for any given SMC at any given instant may have few or many pointers attached to it. These queues may increase or decrease in size, and, in extreme circumstances, may increase in size dramatically in very short period of times, for instance, when there is a storm or other natural disaster that interrupts telephone service. For example, as shown in FIG. 2, associated with front end $50n$, one SMC queue, e.g., $80n_{m-1}$, may have ten customer complaints, i.e., pointers 86' associated with it, while another SMC queue, e.g., $80n_m$, being associated with an area having just incurred a natural disaster, may have tens of thousands of customer complaints, i.e., pointers 86" associated with that SMC. There is, in principle, no limit to the size of any queue, i.e., to the number of pointers (troubles) that may be enqueued upon it.

Currently, as shown in FIG. 2, each LMOS SDU employs a "Drainer" mechanism, indicated by arrow 99, that iteratively loops through all of the queues (one for each SMC) and selects the queue for screening in a fixed, orderly fashion, with the processing time allocated to a single SMC determined on the basis of three variable parameters: Queue Size (Q), the single-pass drain limit controlling how many pointers will be drained from the queue at a maximum before the Drainer passes on to examine the queue for the next SMC; Throttle Time (T), the predetermined amount of time that the process idles or sleeps after each item in the queue for that SMC is screened; and, Sleep Time (S), the time delay before the SDU begins to drain the next SMC queue. Thus, as an example, if there are greater or equal to "Q" troubles on a queue "x", and the throttle time is "t" seconds, then exactly Q troubles will be drained from the queue "x" in Qt seconds (ignoring processing overhead) when queue "x" is allocated its "turn" by the Drainer. The sleep time "s" is additional time the Drainer "rests" after processing a queue (and before it begins processing the next queue). By varying the Q,T and S parameters, it is possible to increase or reduce the time slice used by the Drainer relative to LMOS as a whole.

Currently, there is no mechanism for dynamically adjusting these parameters in response to changes in load distribution, i.e., unbalanced queue sizes. Thus, it is possible that some of the queues may increase in size to the point where a number of hours may elapse between the time a trouble is called in and the time that it is screened. Traditional queue management/queue selection techniques are not particularly useful in this connection because it is not possible to determine how many elements (pointers) reside on each queue.

Thus, it would be highly desirable to provide a mechanism that dynamically adjusts the S,T and/or Q parameters to properly balance the drain queue load and optimize Drainer performance in the face of unpredictable real-time demands.

Furthermore, it would be highly desirable to find a queue management system that manages queues in the absence of knowledge of the number of queues and size of each queue, since as mentioned herein, such knowledge is not readily available to the Drainer.

SUMMARY OF THE INVENTION

Generally, the invention is a queue management system implementing a fuzzy controller that manages queues in the absence of knowledge of the size of each queue and which can be applied to a system which contains an arbitrary number of queues.

Particularly, the queue management system is a watchdog expert system employing a fuzzy logic controller implemented by the LMOS Drainer to monitor the queuing environment and to effect increases or decreases in the Q, S and T parameter values as needed. As opposed to most queue management implementations, the controller does not dictate which queue to select from, but rather controls the environment in which the queue manager operates. Thus, it determines a first stable state which the Drainer attempts to maintain over time and then adjusts the parameters to keep the controller output as close to this first stable state as possible.

The various features of novelty which characterize the invention are pointed out with particularity in the claims annexed to and forming a part of the disclosure. For a better understanding of the invention, its operating advantages, and specific objects attained by its use, reference should be had to the drawings and descriptive matter in which there are illustrated and described preferred embodiments of the invention.

DETAILED DESCRIPTION OF THE INVENTION

Figure 1:
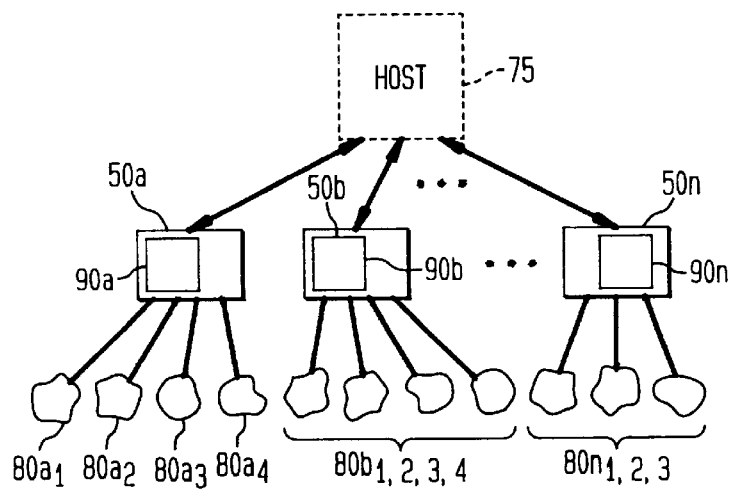
FIG. 1 illustrates an example plurality of SMC queues each containing trouble items and an LMOS SDU for servicing the queues.
Figure 2:
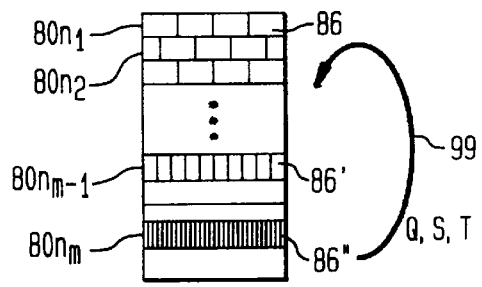
FIG. 2 illustrates a drainer servicing troubles for an example set of SMC queues.

The invention is a control system that implements "fuzzy logic" for a queue management system that dynamically services an arbitrary but determinable or predetermined number of queues, each queue having an indeterminate number of members. Hereinafter, the novel control system is referred to as the "fuzzy controller". In the context of the LMOS drainer system, the predetermined number of queues is the number of service maintenance centers (SMCs) with the number of members of each queue representing the number of customer complaints (pointers) associated with that SMC at any time. As mentioned above, the LMOS drainer is a queue server which dequeues messages ("troubles") from a set of queues, with each queue holding customer complaints received in each SMC. The drainer services the queues in a fixed order guided by three parameters Q, S, T, described above, and is essentially an infinite loop in which each queue's relative service order never varies. For purposes of explanation, a drainer pass is represented as "epoch$_n$" where the number "n" is an index with n=1,2,3, . . . etc., representing each successive pass performed by the drainer. When the drainer is started, the first pass is referred to as "epoch$_1$" and the second pass is referred to as "epoch$_2$", etc. It should be understood that after each current epoch$_n$, the drainer control system is able to determine which queues still contain pointers and have not been fully emptied by the drainer service. It is the number of queues that have not been fully drained after a series of epochs starting with the one just completed (epoch$_n$) and going back to contiguous epochs n−1, n−2 and n−3, that provide the inputs to the fuzzy logic rules and hence that drive the controllers. The rules determine how the parameter values Q,S and T are to be adjusted for the next successive epoch, i.e, epoch$_{n+1}$. This is because after each epoch, information regarding the effectiveness of the drainer activity, i.e., its history, is reflected by the number of queues which have not been completely emptied (hereafter referred to as "active" or "undrained" queues). Thus, the overall number of active queues (hereinafter referred to as "NAQ", is ascertained after each successive epoch, and these values are used to adjust the Q, S and T parameters to achieve stability relative to a user defined set point, e.g., a desirable number of non-empty (and thus, also empty) queues, as will be explained.

Particularly, as will be described, there is one controller for each parameter to be adjusted. Though the controllers are linked, in a sense, the linking is not the kind typical of "multi-stage fuzzy controllers such as disclosed, e.g., in H-P Chen & T-M Parng, "A New Approach of Multi-stage Fuzzy Logic Inference," Fuzzy Sets and Systems 78 (1996) 51–72. Rather, the parameters are prioritized relative to their overall impact on system resources, which is taken to correspond inversely to the desirability of having the controller move them from their default values. The parameter with the least impact, then, is adjusted first, and is controlled by the "first-stage" controller using, e.g., epochs n and n−1. This adjustment should affect the NAQ at epoch$_{n+1}$ which will become the "new" NAQ of the "second-stage" controller an epoch later. Thus, the "second-stage" controller gets each "new" NAQ after it has been influenced by the "first-stage" controller. Note, however, that the output of the "first-stage" controller is a new QSIZE, not a new NAQ. Similarly, the "third-stage" controller is indirectly connected to the "first-stage" and "second-stage" controllers. For the specific controller under study here, the prioritization is QSIZE, THROTTLE TIME, SLEEP TIME.

According to the principles described herein, the novel control system implementing "fuzzy logic" may be implemented in any application where servicing of an arbitrary number of queues of indeterminate lengths needs to be managed.

The fuzzy controller of the invention implements rules that are stated in the well known TSK (Takagi-Sugeno-Kang) form, which means that the conclusion of each rule stands in functional rather than logical relation to its antecedent. Thus, each rule is of the general form: output=π(f (input)) where π is the "truth" of the rule and is typically taken to be (and is taken here to be) min($\mu$(A), $\mu$(B)), where $\mu$(A) and $\mu$(B) represent the membership values of the inputs in the corresponding antecedent fuzzy sets of the rule. Rule combination is straightforward and consists of a weighted average computation in accordance with equation 1 as follows:

$$output = \frac{\sum_i (\tau_i (f_i(input_i)))}{\sum_i (\tau_i)} \quad 1)$$

where "i" is the total number of rules in each fuzzy controller.

Figure 3A:
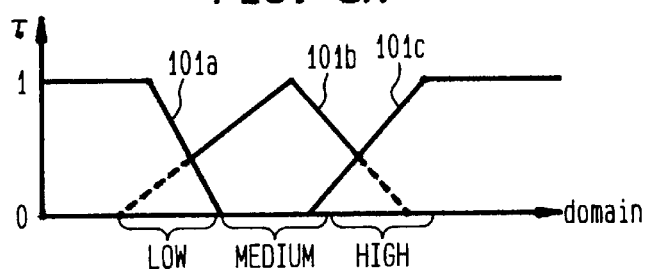
FIG. 3(a) is a general illustration depicting fuzzy sets used by the fuzzy logic controller of the invention.
Figure 3B:
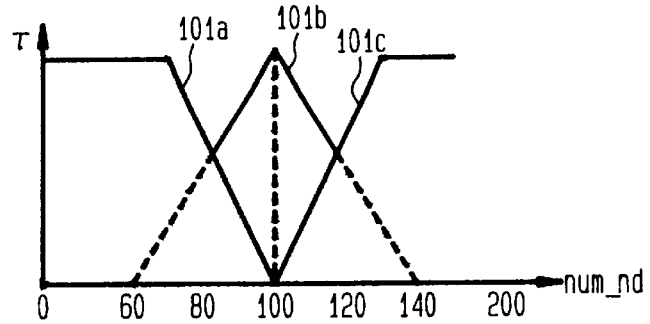
FIG. 3(b) is an example illustration of fuzzy sets depicting the domain of non-drained queues remaining after a single drainer pass with an example set point of 100 undrained queues.

FIG. 3(a) illustrates the fuzzy sets 101a, 101b, 101c used by the controllers for adjusting the Q parameter dynamically. Each set is triangular or semi-trapezoidal shaped and represents a membership value or a "truth" value "π" for any input in its domain. For instance, as shown in FIG. 3(b), the domain is "num_nd," i.e., the x-axis represents the number of non-drained queues remaining after a single drainer pass. The first fuzzy set 101a describes what a low num_nd means, i.e., what it means to say that a low number of non-drained queues remain after a single drainer pass; similarly, a second fuzzy set 101b represents the meaning of a "medium" number of non-drained queue; and, a third fuzzy set 101c represents the meaning of a "high" non-drained queue input domain, i.e., a high number of non-drained queues remaining after a single drainer pass. It should be understood that the fuzzy sets 101a,b,c do not have to be triangular but may be trapezoidal or Gaussian (bell) shaped should the requirements of a particular application so dictate. As shown in FIG. 3(b), the spreads of each of the low and high fuzzy sets 101a and 101c, respectively, overlap with the spread of the medium fuzzy set. The spreads may be adjusted to achieve a 50% overlap; however, this is a design choice and more or less overlap between the sets may be appropriate. For example, as shown in FIG. 3(b), if there are 200 SMC's, i.e., 200 queue sets, the low input domain may range from 0 to 70 non-empty queues, the medium input domain may range from 60 to 130 non-empty queues, and the high input domain may range from 120 to 200 non-empty queues. The degree of overlap, then, will determine whether a value like 40, for example, will have a non-zero membership in both "low" and "medium", or, exclusively in "low". Additionally, as shown in FIGS. 3(a) and 3(b), the y-axes of each of the fuzzy set function represents the output truth value "π" or the degree of match, stated as a value in the range 0 to 1, as is customary in fuzzy controllers. Thus, by determining the truth values for the antecedents of each rule and using equation 1, a new value for the QSIZE parameter is generated after each drainer epoch.

The fuzzy controllers for the other parameters, specifically for the case at hand THROTTLE TIME and SLEEP TIME, use exactly the same fuzzy sets in the rule antecedents. The only difference, as described above, is that for THROTTLE TIME the inputs are num_nd$_{t-1}$ and num_nd$_{t-2}$, while for SLEEP TIME, the inputs are num_nd$_{t-2}$ and num_nd$_{t-3}$ (as opposed to the controller for QSIZE where the inputs are num_nd$_t$ and num_nd$_{t-1}$).

Listed immediately below are the rules for each of the Q,T and S parameter fuzzy controllers:

Rules for adjusting Qsize parameter controller (controller 1):

RULE 1—IF OLD IS HIGH AND NEW IS LOW THEN INCREASE QSIZE A LOT (this is an odd case—if number suddenly goes from high to low may indicate a runaway queue so increase size quicky to try to rein it back in) e.g. RULE 1 consequent=(1.75 * QSIZE)

RULE 2—IF OLD IS HIGH AND NEW IS MED THEN INCREASE QSIZE A LITTLE e.g. RULE 2 consequent= (1.25 * QSIZE)

RULE 3—IF OLD IS HIGH AND NEW IS HIGH THEN INCREASE QSIZE A LITTLE e.g. RULE 3 consequent= (1.5 * QSIZE)

RULE 4—IF OLD IS MED AND NEW IS LOW THEN DECREASE QSIZE A LITTLE e.g. RULE 4 consequent= (0.75 * QSIZE)

RULE 5—IF OLD IS MED AND NEW IS MED THEN NO CHANGE e.g. RULE 5 consequent=(QSIZE * (0.2 * (QSIZE-set_Point)))

RULE 6—IF OLD IS MED AND NEW IS HIGH THEN INCREASE QSIZE A LITTLE e.g. RULE 6 consequent= (1.25 * QSIZE)

RULE 7 IF OLD IS LOW AND NEW IS LOW THEN? (SEE Consequent) (special case—if number of undrained queues is small and getting smaller there may exist a runaway queue so make queue size bigger to rein it in; otherwise, slowly decrease qsize and hope the runaways are settling down) e.g. RULE 7 consequent=(if old>=new (1.75 * QSIZE)) (if old<new (0.75 * QSIZE))

RULE 8—IF OLD IS LOW AND NEW IS MED THEN DECREASE QSIZE A LITTLE e.g. RULE 8 Consequent=(0.75 * QSIZE)

RULE 9—IF OLD IS LOW AND NEW IS HIGH THEN INCREASE QSIZE A LOT e.g. RULE 9 consequent= (1.75 * QSIZE)

RULE 10—IF OLD=0 (NONE) AND NEW=0 THEN DECREASE QSIZE A LITTLE (if both zero then just bring the size down a bit until not both zero—note here antecedent test is not fuzzy) e.g. RULE 10 consequent= (0.9 * QSIZE)

Rules for adjusting Throttle time T parameter (controller 2) (consequents same as for controller 1, mutatis mutandis, except as noted)

RULE 11—IF OLD IS HIGH AND NEW IS LOW THEN DECREASE THRTIME A LOT

RULE 12—IF OLD IS HIGH AND NEW IS MED THEN DECREASE THRTIME A LITTLE

RULE 13—IF OLD IS HIGH AND NEW IS HIGH THEN DECREASE THRTIME A LITTLE

RULE 14—IF OLD IS MED AND NEW IS LOW THEN INCREASE THRTIME A LITTLE

RULE 15—IF OLD IS MED AND NEW IS MED THEN NO CHANGE

RULE 16—IF OLD IS MED AND NEW IS HIGH THEN DECREASE THRTIME A LITTLE

RULE 17—IF OLD IS LOW AND NEW IS LOW THEN INCREASE THRTIME A LOT

RULE 18—IF OLD IS LOW AND NEW IS MED THEN INCREASE THRTIME A LITTLE

RULE 19—IF OLD IS LOW AND NEW IS HIGH THEN DECREASE THRTIME A LOT

RULE 20—IF OLD=0 (NONE) AND NEW=0 THEN THROTTLE TIME=SETPOINT (special case if both zero then just return throttle time to the setpoint)

Rules for adjusting Sleep time S parameter (controller 3) (consequents same as for controller 1, mutatis mutandis, except as noted)

RULE 21—IF OLD IS HIGH AND NEW IS LOW THEN DECREASE SLPTIME A LOT

RULE 22—IF OLD IS HIGH AND NEW IS MED THEN DECREASE SLPTIME A LITTLE

RULE 23—IF OLD IS HIGH AND NEW IS HIGH THEN DECREASE SLPTIME A LITTLE

RULE 24—IF OLD IS MED AND NEW IS LOW THEN INCREASE SLPTIME A LITTLE

RULE 25—IF OLD IS MED AND NEW IS MED THEN NO CHANGE

RULE 26—IF OLD IS MED AND NEW IS HIGH THEN DECREASE SLPTIME A LITTLE

RULE 27—IF OLD IS LOW AND NEW IS LOW THEN INCREASE SLPTIME A LOT

RULE 28—IF OLD IS LOW AND NEW IS MED THEN INCREASE SLPTIME A LITTLE

RULE 29—IF OLD IS LOW AND NEW IS HIGH THEN DECREASE SLPTIME A LOT

RULE 30 IF OLD=0 (NONE) AND NEW=0 THEN SLPTIME=SETPOINT (special case if both zero then just return sleep time to the setpoint)

Figure 4:
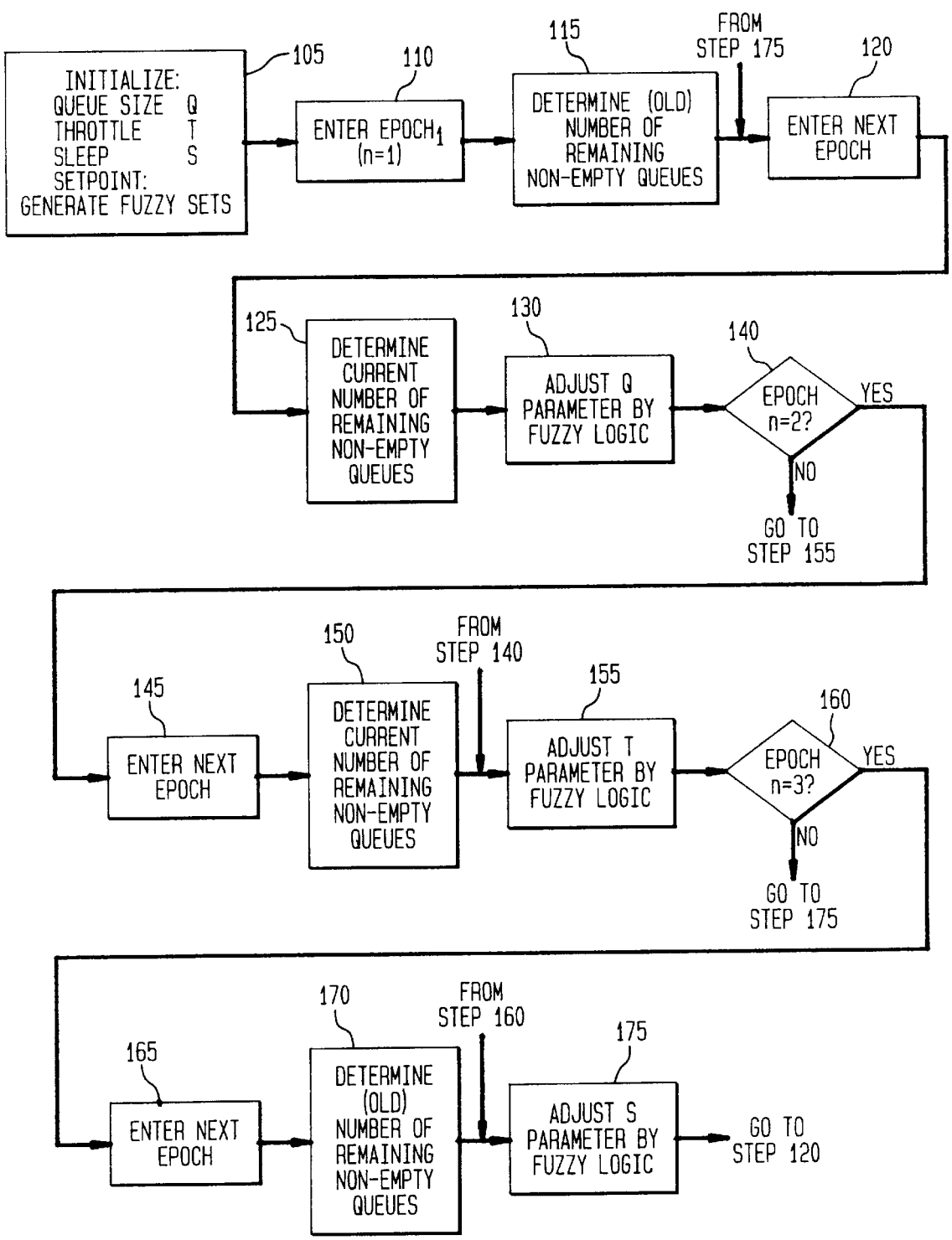
FIG. 4 is a flow chart depicting the algorithm for adjusting the Q, S and T parameters in the fuzzy logic controller.

The fuzzy logic controller implemented in a queue management system will now be explained generally in view of FIG. 4. As shown in FIG. 4, the first step 105 is to initialize all of the critical system parameters and fuzzy sets. Based on the number of queues, i.e., number of SMCs, and utilizing conventional means, the controller initialization software generates the three triangular fuzzy sets used by the controllers. Additionally, the system set point for each controller is set to its default value. These values are user-defined, and for the LMOS drainer application, the default set point for the QSIZE controller is taken to be 50% of the total number of queues and for the THROTTLE and SLEEPTIME controllers is set to an arbitrary but reasonable value (e.g., 5 seconds). "Forbidden Zones" for the output values are also set up so that the controller outputs cannot drift so far from the set point that responses to changes in the environment will happen too slowly. For QSIZE, maximum drift in either direction is set at three (3) multiplied by the set point and the max change in output in an epoch, i.e., 3*set point* max change in output per epoch. The value of three is chosen because three epochs worth of history are used among the various controlling inputs. This same "factor" is also used to limit drift in the THROTTLE TIME and SLEEP TIME controllers. Note that these maxima are "controller internal"; practical considerations may dictate that other limits be in effect in the application itself. Thus, for example, THROTTLE TIME and SLEEP TIME are not permitted to drop below 1, since the operating system, e.g., UNIX allows only integral sleep times and so the only option below 1 would be zero.

It should be understood that the default value may change depending upon the application. Thus, as shown in FIG. 3(b), if there are two-hundred queues (200), the triangular shaped fuzzy sets for low, medium and high spreads are shown as sets 101a, 101b and 101c, respectively, with the setpoint determined to be, e.g., 100.

Then, as indicated at step 110, the drainer begins service by looping through the queues in accordance with the Q, S and T parameters. After this first epoch (epoch$_1$) is completed by the drainer, the number of remaining (non-empty) queues is determined at step 115 and that number is preserved in system memory. As there is no history or previous epoch to compare that number to, the drainer proceeds with the next pass, i.e., epoch$_2$, as shown at step 120. After completion of epoch$_2$, the controller determines the "num__nd" value, i.e., the number of queues remaining undrained at step 125. Since the current epoch is 2, then there is enough history to adjust the first parameter Q by fuzzy logic. Thus, as indicated at step 130, fuzzy logic is applied to adjust the queue size parameter, Q. After adjusting the queue size parameter, the controller determines if there is enough history (num__nd values) for adjusting the other controller parameters S and T. It does this at step 140 by determining whether the current epoch n is equal to 2. If the current epoch does not equal two, then it is assumed that there is enough history and the process proceeds directly to step 155 to adjust the next controller parameter T. If, at step 140, the current epoch is n=2, then the drainer proceeds to enter the next epoch, i.e., epoch$_3$, at step 145 utilizing the new adjusted Q parameter. After completion of epoch$_3$, the controller determines the "num__nd" value, i.e., the number of queues remaining undrained at step 150. Then, at step 155, the controller dynamically adjusts the T parameter, which necessarily requires that the num__nd values have been computed for the previous two epochs. After adjusting the T parameter, the controller determines if there is enough history (num__nd values) for adjusting the last controller parameter S. It does this at step 160 by determining whether the current epoch n is equal to 3. If the current epoch does not equal three, then it is assumed that there is enough history and the process proceeds directly to step 175 to adjust the next controller parameter S. If, at step 160, the current epoch is n=3, then the drainer proceeds to enter the next epoch, i.e., epoch$_4$, at step 165 utilizing the new adjusted Q and T parameters. After completion of epoch$_4$, the controller determines the "num__nd" value, i.e., number of queues remaining undrained at step 170. Then, at step 175, the controller dynamically adjusts the S parameter, which necessarily requires that the num__nd values have been computed for the previous three epochs. The process proceeds continuously by returning to step 120 where the next epoch is entered. In subsequent epochs, the Q, T and S parameters are successively adjusted after completion of each epoch.

It should be understood that the adjustment of the Q, S and T parameters, in the order as described, are made in accordance with a ranking based on the impact each parameter has on drainer (queue management) system resource allocations. In other applications, of course, such a ranking must be determined in order to ensure optimum system performance and resource conservation.

Figure 5:
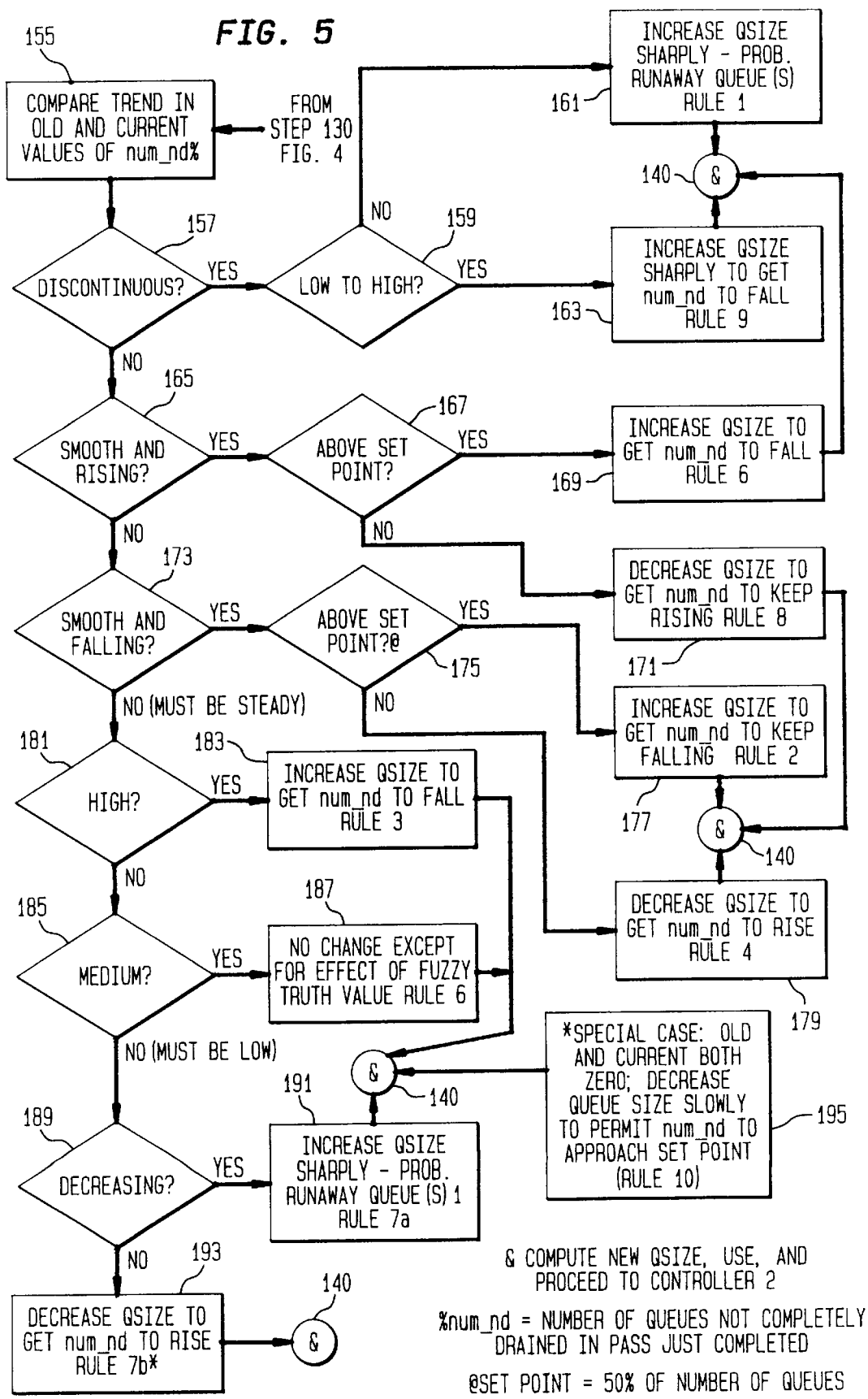
FIG. 5 is a flow chart depicting the fuzzy logic RULES invoked for adjusting the Q parameter.

The algorithm for adjusting the Q parameter of step 130 (FIG. 4), is now explained in greater detail with respect to FIG. 5. Particularly, according to the principles of the invention, above-mentioned equation 1 is implemented in the fuzzy logic controller to determine which fuzzy logic rule or rules is to be applied for adjusting the QSIZE given the remaining number of non-drained queues of the current epoch, epoch, and, the remaining number of non-drained queues of a predecessor epoch, epoch$_{n-1}$. As shown in FIG. 5, the resulting trend or direction of the outputs are compared at step 155 to determine which rule to apply. In an example scenario assuming 200 queues, if it is determined that after a prior epoch, epoch$_{n-1}$, a high number of queues are not completely drained, e.g., num__nd=176, and, after the current epoch$_n$, it is determined that a low number of queues have not been completely drained, e.g., num__nd=5, then, as indicated at step 157, this signifies a discontinuous trend (epoch$_{n-1}$→epoch$_n$) of high to low because the medium fuzzy set (ranging from 60 to 140 has been bypassed (See FIG. 3(b)). In terms of the LMOS application, this trend may signify one or more runaway queues. Thus, an appropriate rule, e.g., RULE 1, is to be applied to increase the Qsize parameter for the next drainer epoch to try to rein the runaway queue back in. RULE 1 requires that Qsize increase sharply as indicated at step 161 in order to reduce the size of the (presumably) runaway queue(s). If the transition from (epoch$_{n-1}$→epoch$_n$) is discontinuous from low to high, as indicated at step 159, then this may indicate that Qsize is simply too small and RULE 9, is applied to increase Qsize sharply to increase the likelihood of emptying queues in the next epoch. It should be pointed out that these flow charts and explanations are provided for the sake of clarity of exposition only. The "determination of trends" is not a separate step but is performed automatically by simple application of the controller (except as specifically noted in the flow charts of FIGS. 5, 6 and 7). Thus, for instance, what is referred to as a "discontinuous low to high" trend simply means that only Rule 1 will have a non-zero truth value when the QSIZE controller is involved. To the extent, say, that Rule 4 is also fired, the effect of Rule 1 will be mitigated, i.e., in effect, the controller is less certain that there is a runaway queue. Again, it must be emphasized that the present discourse is by way of explication only and involves no additional mechanism or overhead apart from the controller itself.

If it is determined at step 157 in FIG. 5, that the trend is not discontinuous, then, as indicated at step 165, a determination is made whether the trend (epoch$_{n-1}$→epoch$_n$) is smooth and rising. This trend may occur, for example, when after the old epoch$_{n-1}$, a medium number of queues remain non-drained, e.g., num_nd=115, and, after epoch2, a relatively high number of queues remain non-drained, e.g., num_nd=156. In such a case, the fuzzy controller will determine that this is a smooth rising trend. Consequently, at step 167, a determination is made as to whether the remaining non-drained value is above the setpoint (i.e., the trend is rising away from the set point), which for the example scenario, is set to 100. If it is determined at step 167 that the remaining non-drained value is above the setpoint, then, at step 169, the fuzzy controller will apply a rule RULE 6 to increase Qsize parameter a little so that more troubles will be drained from each queue in the next epoch to attempt to bring down the number of remaining non-drained queues towards the setpoint. If it is determined at step 167 that the remaining non-drained value is below the setpoint (i.e., the trend is rising toward the set point), then, at step 171, the fuzzy controller will invoke rule RULE 8 to decrease Qsize so as to help num_nd along in its current trend.

If it is determined at step 165 in FIG. 5, that the trend is not smooth and rising, then, as indicated at step 173, a determination is made whether the trend (epoch$_{n-1}$→epoch$_n$) is smooth and falling. This trend may occur, for example, when after the old epoch$_{n-1}$, a high number of queues remain non-drained, e.g., num_nd=156, and, after epoch2, a medium number of queues remain non-drained, e.g., num_nd=114. If this is the case, at step 175, a determination is made as to whether the remaining non-drained value is above the setpoint, which for the example scenario, is set to 100. If it is determined at step 175 that the remaining non-drained value is above the setpoint, then, at step 177, the fuzzy controller will apply RULE 2 to increase Qsize parameter a little so that more queues may be completely emptied in the next epoch and that the trend may continue toward the setpoint. If it is determined at step 175 that the remaining non-drained value is below the setpoint, then, at step 179, the fuzzy controller will invoke RULE 4 to decrease Qsize so that the number of queues remaining unemptied will increase towards the set point.

If it is determined that the trend between epoch$_{n-1}$→epoch$_n$ is neither discontinuous, smooth and rising, nor smooth and falling, then it is surmised that the trend is steady. However, it is necessary to determine where, in relation to the setpoint, the number of remaining queues is after the current epoch. Thus, at step 181, if it is determined that the number of non-drained queues remaining is high, i.e., above the setpoint, then at step 183, the fuzzy controller will invoke RULE 3 to increase Qsize so that the number of queues remaining will decrease towards the set point. If, at step 185, it is determined that the amount of non-drained remaining queues is medium, i.e., at or very near the setpoint, then at step 187, the fuzzy controller will invoke RULE 5 that will effect no change except to encourage a slow drift toward the set point. If, at step 189, it is determined that the amount of non-drained queues remaining is low, then at step 191, the fuzzy controller must determine if the trend is decreasing. Thus, if the trend is such that the number of queues is small and getting smaller, then there is the probability that one or more runaway queues exists. Thus, at step 191, the fuzzy controller will invoke RULE 7a to increase QSIZE in an attempt to rein the runaway queue (s) in. Else, as indicated at step 193, the fuzzy controller will implement RULE 7b to decrease QSIZE so that the number of queues remaining will increase towards the set point.

As shown at step 195, the fuzzy controller also uses a rule, RULE 10, for the special case where the number of undrained queues is zero (0) after both epoch$_n$ and epoch$_{n-1}$. In such a case, RULE 10 will act to decrease Qsize slowly to permit the number of queues remaining undrained to approach the setpoint.

After the adjustment of Q for the current epoch has been completed (i.e., the rule consequents have been amalgamated and a new QSIZE determined), the algorithm proceeds to step 145 (FIG. 4) and enters the next epoch if n=2. If n>2, then the process goes straight to step 155 and activates controller 2.

Figure 6:
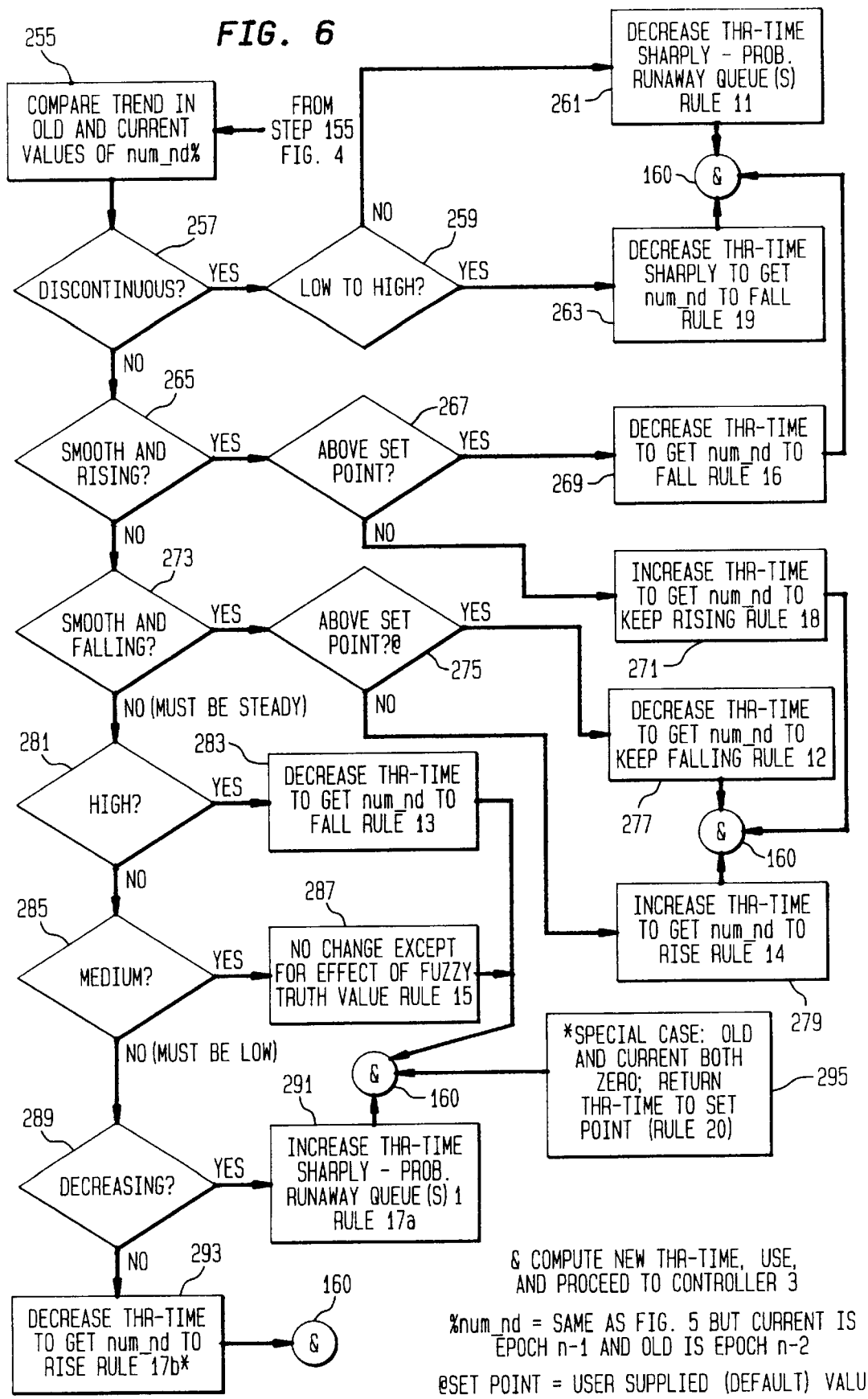
FIG. 6 is a flow chart depicting the fuzzy logic RULES invoked for adjusting the T parameter.

The algorithm for adjusting the T parameter of step 155 (FIG. 4), is now explained in greater detail with respect to FIG. 6. Particularly, according to the principles of the invention, above-mentioned equation 1 is implemented in the fuzzy logic controller to determine which fuzzy logic rule or rules is to be applied for adjusting the throttle time parameter given the remaining number of non-drained queues of the 1st predecessor epoch$_{n-1}$ and the remaining number of non-drained queues of its predecessor epoch$_{n-2}$. As shown in FIG. 6, the resulting trend or direction of the outputs are compared at step 255 to determine which rule to apply. In an example scenario, if it is determined that the number of queues not completely drained has gone from high to low (the medium fuzzy set is bypassed, see FIG. 3(b)), then this trend may signify a runaway queue. Thus, an appropriate rule, RULE 11, is to be applied to decrease the throttle parameter T for the next drainer epoch to try to rein the runaway queue back in. RULE 11 requires that T decrease sharply as indicated at step 261 in order to reduce the size of the (presumably) runaway queue. If the transition from epoch$_{n-2}$ to epoch$_{n-1}$ is discontinuous from low to high, as indicated at step 259, then this may indicate that T is simply too large and a rule, RULE 19, may be applied to decrease T sharply to increase the likelihood of emptying queues in the next epoch.

If it is determined at step 257 in FIG. 6, that the trend is not discontinuous, then, as indicated at step 265, a determination is made whether the trend (epoch$_{n-2}$→epoch$_{n-1}$) is smooth and rising. If the trend is smooth and rising, then at step 267, a determination is made as to whether num_nd value for epoch$_{n-1}$ is above a setpoint default value, which for the example scenario, is set to 5 seconds. If it is determined at step 267 that this value is above the setpoint, then, at step 269, the fuzzy controller will apply a rule, RULE 16, to decrease the T parameter so that the queues will be serviced faster in the next epoch to attempt to bring down the number of remaining non-drained queues towards the setpoint. If it is determined at step 267 that this value is below the setpoint, then, at step 271, the fuzzy controller will invoke a rule, RULE 18, to increase throttle time T so that the number of queues remaining undrained will increase towards the set point.

If it is determined at step 265 in FIG. 6, that the trend is not smooth and rising, then, as indicated at step 273, a determination is made whether the trend (epoch$_{n-2}$→epoch$_{n-1}$) is smooth and falling. If so, then at step 275, a determination is made as to whether num_nd for epoch$_{n-1}$ is above the setpoint, which for the example scenario, is set to 5 seconds. If it is determined at step 275 that this value is above the setpoint, then, at step 277, the fuzzy controller will apply a rule, RULE 12, to decrease the T parameter a little so that the queues will be serviced faster in the next epoch and that the trend may continue toward the setpoint. If it is determined at step 275 that this value is below the setpoint, then, at step 279, the fuzzy controller will implement a rule, RULE 14, to increase throttle time T so that the number of queues remaining undrained can increase towards the set point.

If it is determined that the trend between epoch$_{n-2}$→epoch$_{n-1}$ is neither discontinuous, smooth and rising, nor smooth and falling, then it is surmised that the trend is steady. However, it is necessary to determine where, in relation to the setpoint, the number of remaining queues is after the current epoch. Thus, at step 281, if it is determined that the number of non-drained queues remaining is high, i.e., above the setpoint, then at step 283, the fuzzy controller will implement a rule, RULE 13, to decrease throttle time T so that the number of queues remaining undrained can decrease towards the set point. If, at step 285, it is determined that the number of non-drained queues remaining is medium, i.e., at or very near the setpoint, then at step 287, the fuzzy controller will implement a rule, RULE 15, that will effect no change except to encourage a slow drift toward the setpoint (see Rule 15). If, at step 289, it is determined that the amount of non-drained queues remaining is low, then at step 289, the fuzzy controller must determine if the trend is decreasing. If the trend is such that the number of queues remaining undrained is small and getting smaller, then there is the probability that one or more runaway queues exist. Thus, at step 291, the fuzzy controller will implement a rule, RULE 17a, to decrease throttle time T in an attempt to rein the runaway queue in. Else, as indicated at step 293, the fuzzy controller will implement a rule, RULE 17b, to increase the T parameter so that the number of queues remaining undrained will increase towards the set point.

As shown at step 295 in FIG. 6, the fuzzy controller also uses a rule, RULE 20, for the special case where the number of undrained queues is zero (0) after both epoch$_{n-2}$ and epoch$_{n-1}$. In such a case, RULE 20 simply returns the throttle time parameter T to the user-defined or default setpoint. This is because the design philosophy assumes that subordinate parameters (in this case throttle time and sleep time) should be returned at once to their defaults when the controller is potentially underutilized (when there may be little work for the queue drainer to perform).

After the adjustment of T for the current epoch has been completed (the rule consequents have been amalgamated and a run throttle time determined), the algorithm proceeds to step 165 (FIG. 4) and enters the next epoch if n=3. If n>3, the process goes straight to step 175 and activates controller 3.

Figure 7:
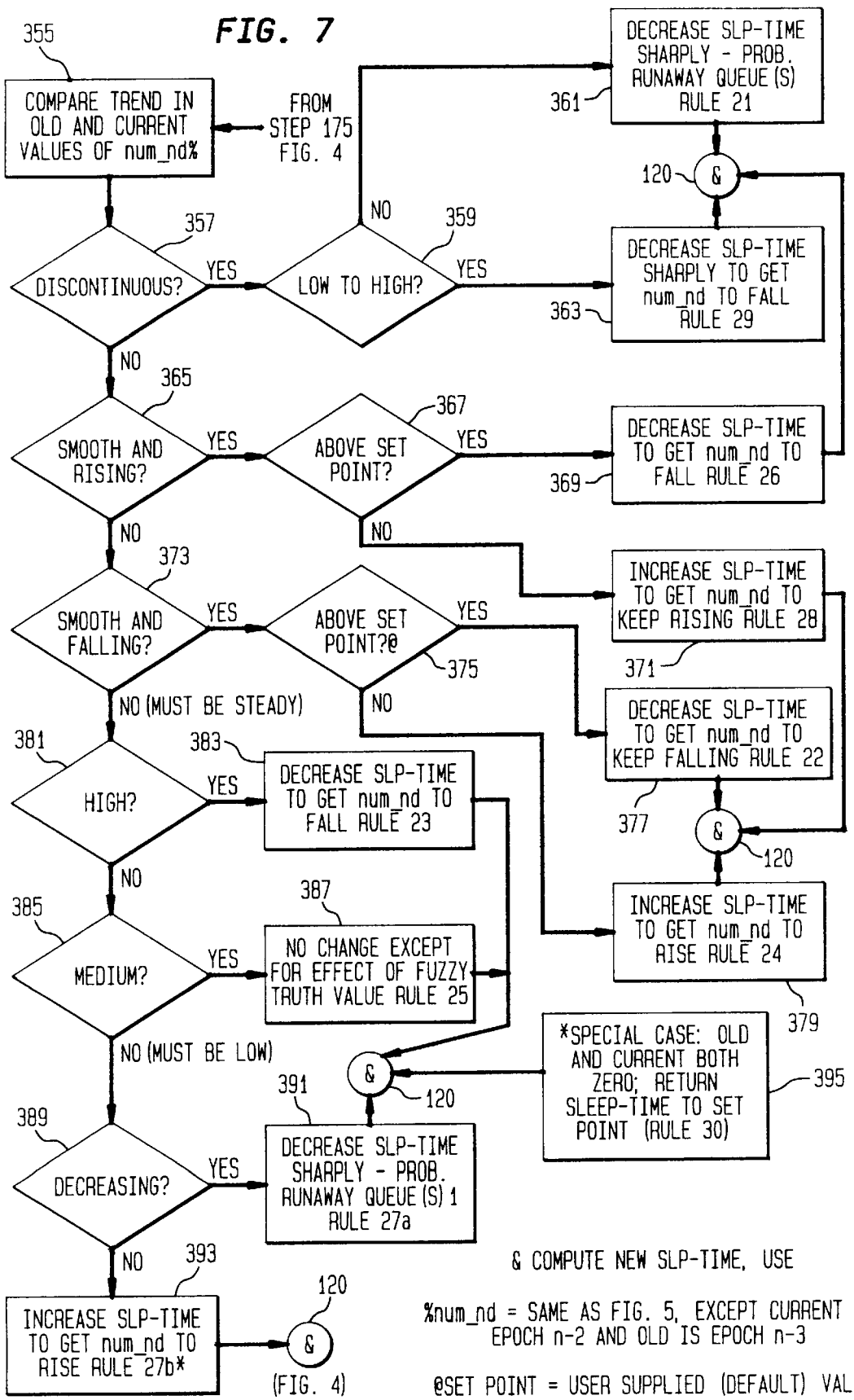
FIG. 7 is a flow chart depicting the fuzzy logic RULES invoked for adjusting the S parameter.

The algorithm for adjusting the S parameter of step 175 (FIG. 4), is now explained in greater detail with respect to FIG. 7. Particularly, according to the principles of the invention, above-mentioned equation 1 is implemented in the fuzzy logic controller to determine which fuzzy logic rule or rules is to be applied for adjusting the sleep time parameter given the remaining number of non-drained queues of the 2nd predecessor epoch$_{n-2}$ and the remaining number of non-drained queues of its predecessor epoch$_{n-3}$. As shown in FIG. 7, the resulting trend or direction of the ratio outputs are compared at step 355 to determine which rule to apply. In an example scenario, if it is determined that the number of queues not completely drained has gone from high to low (the medium fuzzy set is bypassed (see FIG. 3(*b*)), then this trend may signify a runaway queue. Thus, an appropriate rule, RULE 21, is to be applied to decrease the sleep parameter S for the next drainer epoch to try to rein the runaway queue back in. RULE 31 requires that S decrease sharply as indicated at step 361 in order to reduce the size of the (presumably) runaway queue. If the transition from epoch$_{n-3}$ to epoch$_{n-2}$ is discontinuous from low to high, as indicated at step 359, then this may indicate that S is too large and a rule, RULE 29, may be applied to decrease S sharply to increase the likelihood of emptying queues in the next epoch.

If it is determined at step 357 in FIG. 7, that the trend is not discontinuous, then, as indicated at step 365, a determination is made whether the trend (epoch$_{n-3}$→epoch$_{n-2}$) is smooth and rising. If the trend is smooth and rising, then at step 367, a determination is made as to whether num_nd for epoch$_{n-2}$ is above a setpoint (default) value, which for the example scenario, is set to 5 seconds. If it is determined at step 367 that this value is above the setpoint, then, at step 369, the fuzzy controller will apply a rule, RULE 26, to decrease the S parameter so that the queues will be serviced faster in the next epoch to attempt to bring down the number of remaining non-drained queues towards the setpoint. If it is determined at step 367 that this value is below the setpoint, then, at step 371, the fuzzy controller will invoke a rule, RULE 28, to increase sleep time S so that the number of queues remaining undrained will increase towards the set point.

If it is determined at step 365 in FIG. 7, that the trend is not smooth and rising, then, as indicated at step 373, a determination is made whether the trend (epoch$_{n-3}$→epoch$_{n-2}$) is smooth and falling. If so, then at step 375, a determination is made as to whether the num_nd value for epoch$_{n-2}$ is above the setpoint, which for the example scenario, is set to 5 seconds. If it is determined at step 375 that this value is above the setpoint, then, at step 377, the fuzzy controller will apply a rule, RULE 22, to decrease the S parameter a little so that the queues will be serviced faster in the next epoch and that the trend of remaining non-drained queues may continue toward the setpoint. If it is determined at step 375 that this value is below the setpoint, then, at step 379, the fuzzy controller will implement a rule, RULE 24, to increase sleep time S so that the number of queues remaining undrained can increase towards the set point.

If it is determined that the trend between epoch$_{n-3}$→epoch$_{n-2}$ is neither discontinuous, smooth and rising, nor smooth and falling, then it is surmised that the trend is steady. However, it is necessary to determine where, in relation to the setpoint, the number of remaining queues is after the current epoch. Thus, at step 381, if it is determined that the number of non-drained queues remaining is high, i.e., above the setpoint, then at step 383, the fuzzy controller will implement a rule, RULE 23, to decrease sleep time S so that the number of queues remaining can decrease towards the set point. If, at step 385, it is determined that the number of non-drained queues remaining is medium, i.e., at or very near the setpoint, then at step 387, the fuzzy controller will implement a rule, RULE 25, that will effect no change except to encourage a slow drift toward the set point (See Rule 25). If, at step 389, it is determined that the amount of non-drained queues remaining is low, then at step 389, the fuzzy controller must determine if the trend is decreasing. If the trend is such that the number of queues remaining is small and getting smaller, then there is the probability that one or more runaway queues exist. Thus, at step 391, the fuzzy controller will implement a rule, RULE 27a, to decrease sleep time S in an attempt to rein the runaway queue in. Else, as indicated at step 393, the fuzzy controller will implement a rule, RULE 27b, to increase the S parameter so that the number of queues remaining undrained will increase towards the set point.

As shown at step 395 in FIG. 7, the fuzzy controller also uses a rule, RULE 30, for the special case where the number of undrained queues is zero (0) after both epoch$_{n-3}$ and epoch$_{n-2}$. In such a case, RULE 30 simply returns the sleep time parameter S to the user-defined or default setpoint. This is because the design philosophy assumes that subordinate parameters (in this case throttle time and sleep time) should be returned at once to their defaults when the controller is potentially underutilized (when there may be little work for the queue drainer to perform).

After the adjustment of T for the current epoch has been completed (the rule consequents have been amalgamated and a run sleep time determined), the algorithm returns to step 120 (FIG. 4) and enters the next epoch to dynamically repeat the process (FIGS. 5–7).

The foregoing merely illustrates the principles of the present invention. Those skilled in the art will be able to devise various modifications, which although not explicitly described or shown herein, embody the principles of the invention and are thus within its spirit and scope.

What is claimed is:

1. Fuzzy logic controller for a queue manager that services a plurality of queues in an iterative fashion, each queue containing an indeterminate number of elements, said manager servicing a plurality of elements in each queue in accordance with a dequeuing quantity parameter, Q, said controller comprising:
   a) means for determining an amount of queues having remaining elements after each servicing iteration and outputting said amount;
   b) means for comparing the difference between a system output representing an amount of queues having remaining elements in a current iteration with a previous output representing an amount of queues having remaining elements in a predecessor iteration, said output difference indicating a first dequeuing trend; and,
   c) means for adjusting said dequeuing quantity parameter Q based on said dequeuing trend, said adjusting means capable of driving said system output toward a predetermined setpoint quantity after each servicing iteration.

2. Fuzzy logic controller as claimed in claim 1, wherein said means for adjusting includes applying one or more rules of a predefined set of rules governing multiple types of first dequeuing trends.

3. Fuzzy logic controller as claimed in claim 2, wherein said rules are stated in accordance with a T-S-K fuzzy logic rule format.

4. Fuzzy logic controller as claimed in claim 1, wherein said predetermined setpoint quantity is user determined.

5. Fuzzy logic controller as claimed in claim 1, wherein said means for determining amount of queues having remaining elements after each servicing iteration includes means for assigning said system output amount of queues having remaining elements to a quantity category after each said service iteration.

6. Fuzzy logic controller as claimed in claim 5, wherein said quantity category includes a low quantity, medium quantity and high quantity.

7. Fuzzy logic controller as claimed in claim 5, further including means for generating a plurality of fuzzy sets and for implementing one or more fuzzy logic rules, each rule for determining a degree of truth value relative to one or more subsets of said plurality of fuzzy sets.

8. Fuzzy logic controller as claimed in claim 7, wherein each said fuzzy logic function is a triangular or trapezoidal function.

9. Fuzzy logic controller as claimed in claim 1, wherein said predecessor iteration is an immediate predecessor.

10. Fuzzy logic controller as claimed in claim 1, wherein said queue manager services elements of each said plurality of queues in accordance with a time delay parameter, T, representing a time delay between servicing each element of a said queue, said controller further including means for comparing the difference between an amount of queues having remaining elements in an immediate predecessor iteration P with an amount of queues having remaining elements in the immediately preceding predecessor iteration P-1, and determining a second dequeuing trend therefrom.

11. Fuzzy logic controller as claimed in claim 10, further including means for adjusting said time delay parameter, T, based on said second dequeuing trend, said adjusting means capable of driving said amount of queues having remaining elements after each servicing iteration toward a predetermined setpoint quantity.

12. Fuzzy logic controller as claimed in claim 11, wherein said means for adjusting includes applying one or more rules of a predefined set of rules governing multiple types of second dequeuing trends.

13. Fuzzy logic controller as claimed in claim 12, wherein said queue manager services elements of each said plurality of queues in accordance with a time delay parameter, S, representing a time delay between servicing each successive queue, said controller further including means for comparing the difference between an amount of queues having remaining elements in a remote predecessor iteration P-1 with an amount of queues having remaining elements in the immediately preceding predecessor iteration P-2, and determining a third dequeuing trend therefrom.

14. Fuzzy logic controller as claimed in claim 13, further including means for adjusting said time delay parameter, S, based on said third dequeuing trend, said adjusting means capable of driving said amount of queues having remaining elements after each servicing iteration toward a predetermined setpoint quantity.

15. Fuzzy logic controller as claimed in claim 14, wherein said means for adjusting includes applying one or more rules of a predefined set of rules governing multiple types of third dequeuing trends.

16. Method implementing fuzzy logic for a queue management system having means for servicing a plurality of queues, each queue containing an indeterminate number of elements, said system iteratively servicing each said plurality of queues in accordance with a dequeuing quantity parameter, Q, said method comprising:
   a) determining an amount of queues having remaining elements after each servicing iteration;
   b) comparing the difference between an amount of queues having remaining elements in a current iteration with an amount of queues having remaining elements in a predecessor iteration, said difference indicating a dequeuing trend;
   c) adjusting said dequeuing quantity parameter Q based on said dequeuing trend, said adjusting means capable of driving said amount of queues having remaining elements after each servicing iteration toward a predetermined setpoint quantity.

17. Method implementing fuzzy logic as claimed in claim 16, wherein said determining step a) includes assigning said amount of queues having remaining elements to a quantity category after each said service iteration.

18. Method implementing fuzzy logic as claimed in claim 17, wherein said quantity category includes a low quantity, medium quantity and high quantity.

19. Method implementing fuzzy logic as claimed in claim 17, further including the step of generating a plurality of sets containing one or more fuzzy logic functions, each function for determining a degree of truth value for each quantity category.

20. Method implementing fuzzy logic as claimed in claim 17, wherein said determining step a) includes implementing a T-S-K controller.

21. Queue management system for servicing a plurality of queues in an iterative fashion, each queue containing an indeterminate number of elements, said system iteratively servicing a number of elements in each said plurality of queues in accordance with a dequeuing parameter, said management system comprising:

a) means for determining an amount of queues having remaining elements after each servicing iteration and outputting said amount;

b) means for comparing the difference between a system output representing an amount of queues having remaining elements in a current iteration with a previous output representing an amount of queues having remaining elements in a predecessor iteration, said output difference indicating a dequeuing trend; and, c) means for adjusting said dequeuing parameter based on said dequeuing trend, said adjusting means capable of driving said system output toward a predetermined setpoint quantity after each servicing iteration.

22. Queue management system as claimed in claim 21, wherein said dequeuing parameter represents the number of elements in each queue to be serviced in each iteration.

23. Queue management system as claimed in claim 21, wherein said dequeuing parameter represents a time delay between servicing each element of a said queue.

24. Queue management system as claimed in claim 21, wherein said dequeuing parameter represents a time delay between servicing each successive queue.

\* \* \* \* \*